United States Patent
Bagchi et al.

(10) Patent No.: US 8,081,687 B2
(45) Date of Patent: Dec. 20, 2011

(54) RECEIVED SIGNAL DETERMINATION BASED UPON FRAME CLASSIFICATION

(75) Inventors: Amit G. Bagchi, Mountain View, CA (US); Rajendra Tushar Moorti, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1133 days.

(21) Appl. No.: 11/542,984

(22) Filed: Oct. 4, 2006

(65) Prior Publication Data

US 2007/0110197 A1 May 17, 2007

Related U.S. Application Data

(60) Provisional application No. 60/735,498, filed on Nov. 11, 2005, provisional application No. 60/777,163, filed on Feb. 27, 2006.

(51) Int. Cl.
*H04B 1/10* (2006.01)
(52) U.S. Cl. .......................... 375/260; 455/509
(58) Field of Classification Search ................. 375/349, 375/316, 260; 455/509, 450; 370/208
See application file for complete search history.

(56) References Cited

U.S. PATENT DOCUMENTS

| | | | |
|---|---|---|---|
| 6,985,545 B2 * | 1/2006 | Teo et al. | 375/349 |
| 7,219,316 B2 * | 5/2007 | Grupp et al. | 716/106 |
| 7,856,068 B1 * | 12/2010 | Tung et al. | 375/267 |
| 2004/0152418 A1 * | 8/2004 | Sinha et al. | 455/42 |
| 2005/0152299 A1 * | 7/2005 | Stephens | 370/315 |
| 2005/0174927 A1 * | 8/2005 | Stephens et al. | 370/206 |
| 2005/0180314 A1 * | 8/2005 | Webster et al. | 370/208 |
| 2005/0190724 A1 * | 9/2005 | Hansen et al. | 370/329 |
| 2005/0282551 A1 * | 12/2005 | Tandai et al. | 455/447 |
| 2006/0018249 A1 * | 1/2006 | Shearer et al. | 370/208 |
| 2006/0034366 A1 * | 2/2006 | Schmidt et al. | 375/239 |
| 2006/0067415 A1 * | 3/2006 | Mujtaba | 375/260 |
| 2006/0115012 A1 * | 6/2006 | Sadowsky et al. | 375/260 |
| 2006/0146869 A1 * | 7/2006 | Zhang et al. | 370/465 |
| 2006/0176908 A1 * | 8/2006 | Kwon et al. | 370/473 |
| 2007/0207823 A1 * | 9/2007 | van Nee et al. | 455/509 |

OTHER PUBLICATIONS

HT PHY Specification V1.01, Enhanced Wireless Consortium publication, Oct. 7, 2005.*
EWC PHY Specification, V1.0, Sep. 4, 2005.*

* cited by examiner

*Primary Examiner* — Chieh M Fan
*Assistant Examiner* — Aristocratis Fotakis
(74) *Attorney, Agent, or Firm* — Garlick Harrison & Markinson; Kevin L. Smith

(57) ABSTRACT

A receiver includes digital logic for defining a plurality of signal paths for an ingoing digital signal to determine a frame classification. Frames are classified according to a combination of readings of a plurality of correlation block and relative signal (power) strengths. Power detection is specified for frequency bands of interest. The combination of readings and their corresponding pattern may be used to determine whether a frame is being transmitted in a lower bandwidth channel, an upper bandwidth channel or a large bandwidth channel that overlaps the lower and upper bandwidth channels. A transmission type (legacy, mixed mode, Greenfield) may subsequently be determined based upon the identity of the frame channel.

21 Claims, 10 Drawing Sheets

| | Lower 20MHz | Upper 20 MHz | 40 MHz | Logic Determination |
|---|---|---|---|---|
| a. | 0 | 0 | 0 | n/a |
| b. | 0 | 0 | 1 | 40 MHz |
| c. | 0 | 1 | 0 | Upper 20 MHz |
| d. | 0 | 1 | 1 | Upper 20 MHz or 40 MHz (depending upon sig. strength) |
| e. | 1 | 0 | 0 | Lower 20 MHz |
| f. | 1 | 0 | 1 | Lower 20 MHz or 40 MHz (depending upon sig. strength) |
| g. | 1 | 1 | 0 | 40 MHz |
| h. | 1 | 1 | 1 | 40 MHz |

FIG. 6

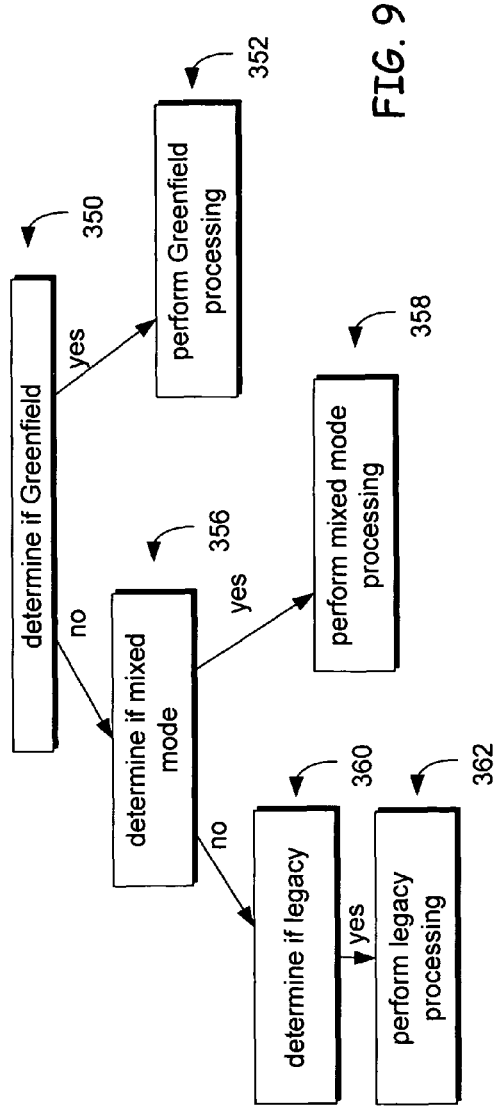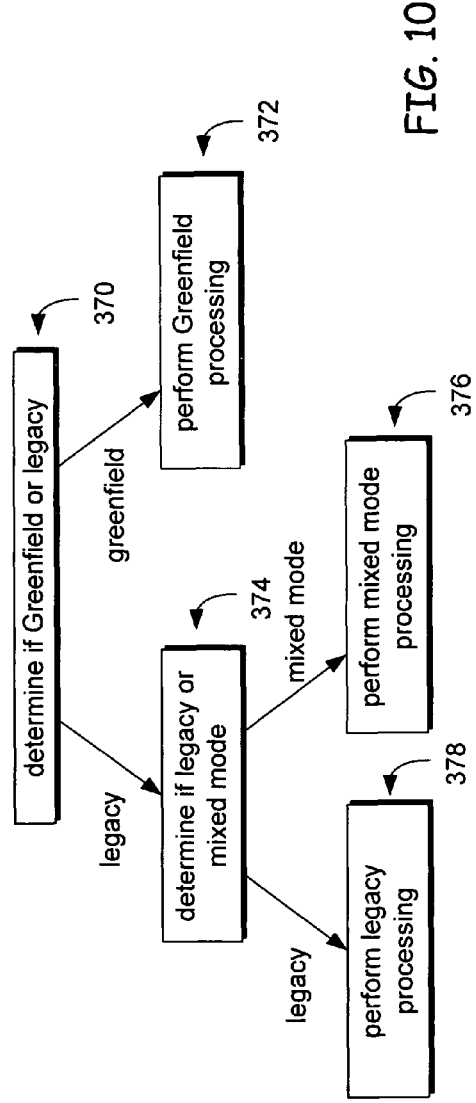

RECEIVED SIGNAL DETERMINATION BASED UPON FRAME CLASSIFICATION

CROSS REFERENCE TO RELATED APPLICATIONS

This application claims priority to and the benefit of, under 35 U.S.C. 119(e), U.S. Provisional Application having a serial number of 60/735,498 filed on Nov. 11, 2005 and to U.S. Provisional Application having a serial number of 60/777,163 filed on Feb. 27, 2006, both of which are incorporated herein by reference for all purposes.

BACKGROUND

1. Technical Field of the Invention

This invention relates generally to wireless communication systems and in particular to a transmitter operating at high data rates within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one or more antennas for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is essentially a single-input-single-output (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a portion of baseband signals into RF signals, which are transmitted via corresponding antennas to a receiver. The receiver includes a single receiver path that receives the multiple RF signals from the transmitter.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a communication system. For example, high data rates can be achieved with MIMO communications in comparison to SISO communications. However, most communication systems include legacy wireless communication devices (i.e., devices that are compliant with an older version of a wireless communication standard). As such, a transmitter capable of MIMO wireless communications should also be backward compatible with legacy devices to function in a majority of existing communication systems.

In addition to the different type of wireless communications (e.g., SISO, SIMO, MISO, and MIMO), the channel bandwidth varies from standard to standard. For example, IEEE 802.11 (j) prescribes a 10 MHz channel bandwidth, IEEE 802.11(a) and (g) prescribe a 20 MHz channel, and IEEE 802.11(n), as being considered for future development, includes a channel bandwidth of 40 MHz. Accordingly, for a radio to be compliant with one or more of these standards, the radio transmitter must be adjustable to accommodate the different channel bandwidths and transmission modes.

A need exists, therefore, for a programmable transmitter that is capable of high data throughput, backward compatible with legacy devices and adjustable to different channel bandwidths. A need further exists for a compatible receiver operable to communicate over a plurality of the aforementioned standards to quickly and accurately determine whether a frequency bandwidth is one of a plurality of bandwidths and to determine what portion of a maximum bandwidth is being utilized for the incoming communication.

SUMMARY OF THE INVENTION

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 6 is a table that illustrates operation of one embodiment of the invention;

FIGS. 9 and 10 are logic flow diagrams that illustrate operation according to two embodiments of the invention.

DETAILED DESCRIPTION OF THE DRAWINGS

Figure 1:
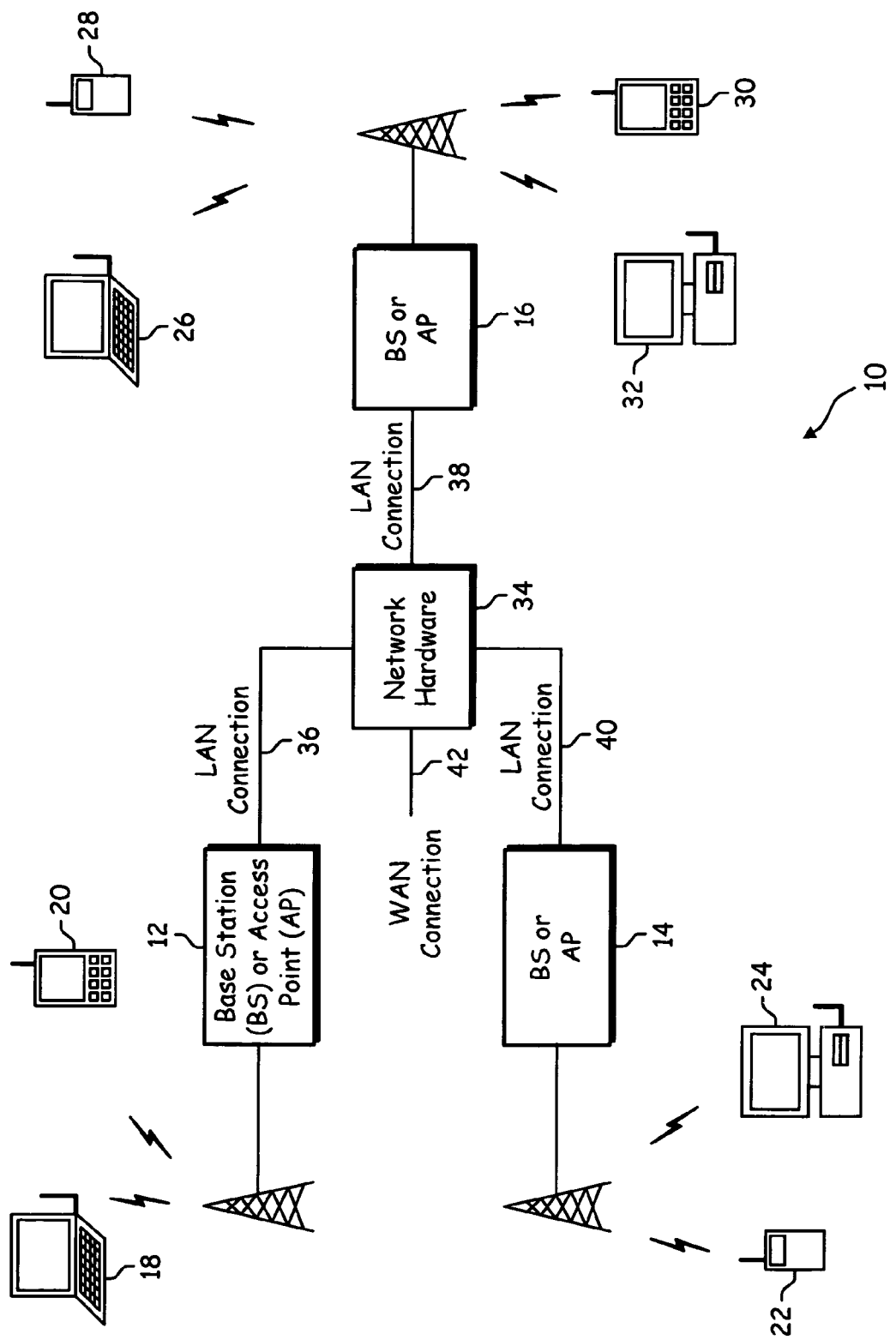
FIG. 1 is a schematic block diagram illustrating a communication system.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, or other similar device, provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. One or more of the wireless communication devices is operable to receive and process ingoing RF having any one of a plurality of transmission formats including associated bandwidths.

Figure 2:
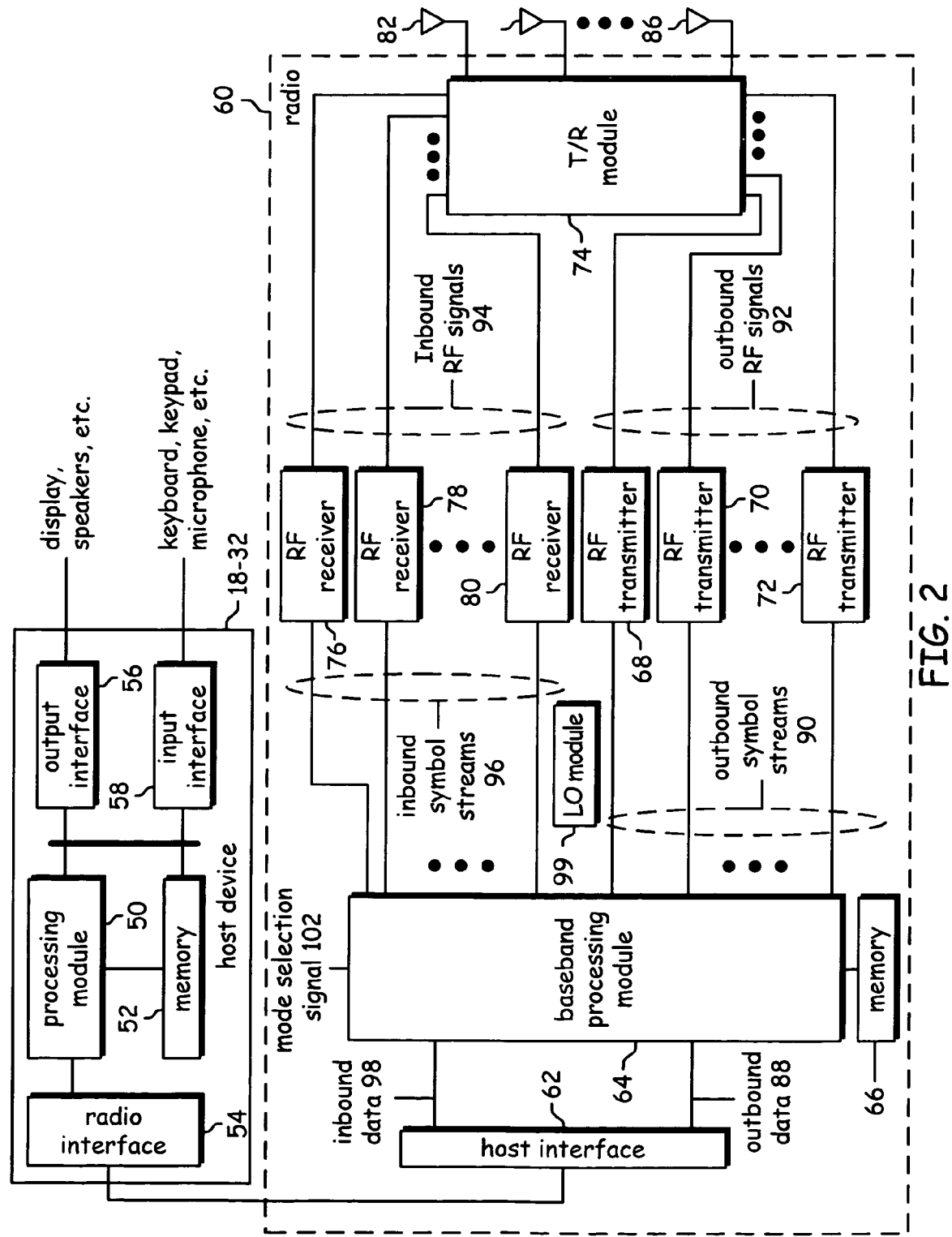
FIG. 2 is a schematic block diagram illustrating a wireless communication device that includes the host device and an associated radio.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphoneor other similar device, via the input interface 58 or may generate the data itself. For data received via the input interface 58, the processing module 50 is operable to perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80 and a local oscillation module 99. The baseband processing module 64, in combination with operational instructions stored in memory 66, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 101, produces one or more outbound symbol streams 90. The mode selection signal 101 indicates a particular mode of operation that is compliant with one or more specific modes of the various IEEE 802.11 standards. For example, the mode selection signal 101 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal 101 may indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per Orthogonal Frequency Division Multiplexing (OFDM) symbol (NCBPS), and/or data bits per OFDM symbol (NDBPS). The mode selection signal 101 may also indicate a particular channelization for the corresponding mode that provides a channel number and corresponding center frequency. The mode select signal 102 may further indicate a power spectral density mask value and a number of antennas to be initially used for a SISO, SIMO, MISO or MIMO communication; and a corresponding space-time and/or space-frequency encoding mode.

The baseband processing module 64, based on the mode selection signal 101 produces one or more outbound symbol streams 90 from the outbound data 88. For example, if the mode selection signal 101 indicates that a single transmit antenna is being utilized for the particular mode that has been selected, the baseband processing module 64 will produce a single outbound symbol stream 90. Alternatively, if the mode select signal 102 indicates 2, 3 or 4 antennas, the baseband processing module 64 will produce 2, 3 or 4 outbound symbol streams 90 from the outbound data 88.

Depending on the number of outbound streams 90 produced by the baseband module 64, a corresponding number of the RF transmitters 68-72 will be enabled to convert the outbound symbol streams 90 into outbound RF signals 92. In general, each of the RF transmitters 68-72 includes a digital filter and upsampling module, a digital to analog conversion module, an analog filter module, a frequency up conversion module, a power amplifier, and a radio frequency bandpass filter. The RF transmitters 68-72 provide the outbound RF signals 92 to the transmit/receive module 74, which provides each outbound RF signal to a corresponding antenna 82-86.

When the radio 60 is in the receive mode, the transmit/receive module 74 receives one or more inbound RF signals 94 via the antennas 82-86 and provides them to one or more RF receivers 76-80. The RF receiver 76-80 converts the inbound RF signals 94 into a corresponding number of inbound symbol streams 96. The number of inbound symbol streams 96 will correspond to the particular mode in which the data was received. The baseband processing module 64 converts the inbound symbol streams 96 into inbound data 98, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3A:
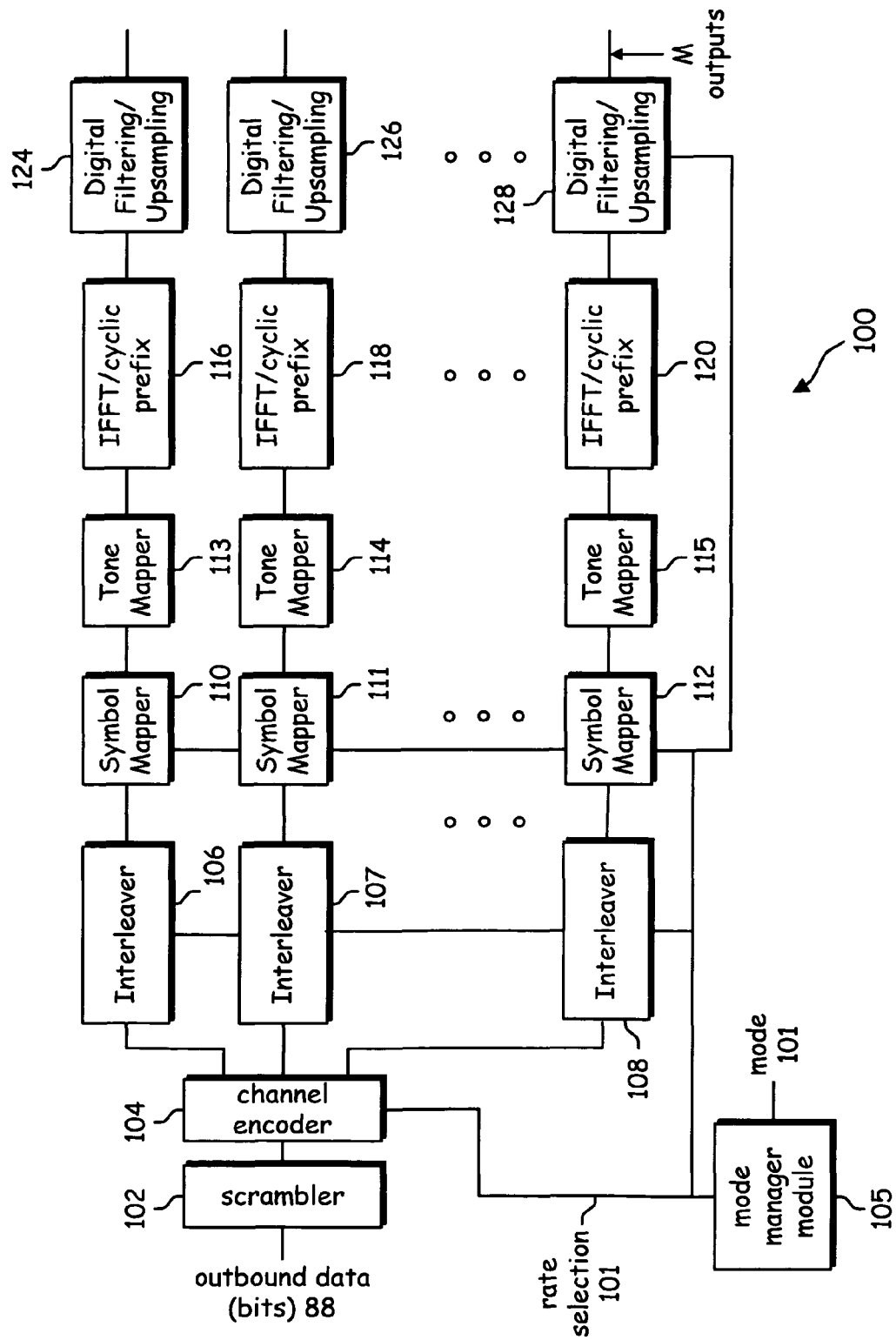
FIG. 3A illustrates an exemplary baseband processing portion of a transmitter.
Figure 3B:
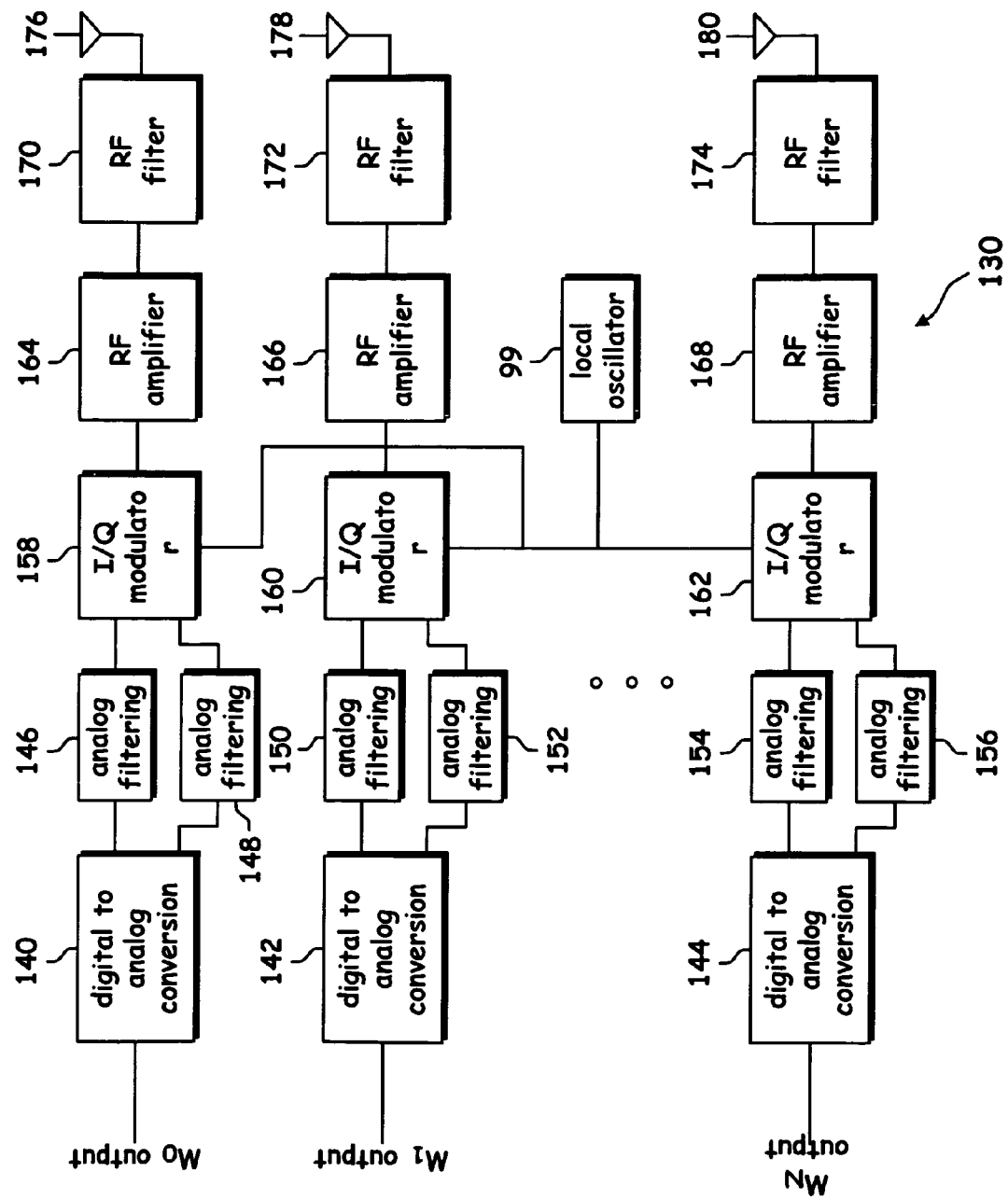
FIG. 3B illustrates an exemplary radio portion of the transmitter.

FIGS. 3A and 3B illustrate a more detailed schematic block diagram of an exemplary multiple transmit path transmitter (e.g., including baseband processing module 64 and RF transmitters 68-72 of the radio transceiver 60 of FIG. 2) using Orthogonal Frequency Division Multiplexing (OFDM) in accordance with the present invention. FIG. 3A illustrates an exemplary baseband processing portion 100 of a transmitter, while FIG. 3B illustrates an exemplary radio portion 130 of the transmitter. In FIG. 3A, the baseband processing portion 100 is shown to include a scrambler 102, channel encoder 104, a plurality of interleavers 106-108, a plurality of symbol mappers 110-112, a plurality of tone mappers 113-115, plurality of inverse fast Fourier transform (IFFT)/cyclic prefix addition modules 116-120 and plurality of digital filter/upsampling modules 124-128. The baseband portion of the transmitter 100 may further include a mode manager module 105 that receives the mode selection signal 101 and produces a rate and transmit mode selection signal 101 for the baseband portion of the transmitter.

In operation, the scrambler 102 adds a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 104 receives the scrambled data and generates a new sequence of bits with redundancy. This will enable improved detection at the receiver. The channel encoder 104 may operate in one of a plurality of modes. For example, in IEEE 802.11(a) and IEEE 802.11(g), the channel encoder has the form of a rate ½ convolutional encoder with 64 states and a generator polynomials of $G_0=133_8$ and $G_1=101_8$. The output of the convolutional encoder may be punctured to rates of 1/2, 2/3 and 3/4 according to specified rate tables. For backward compatibility with IEEE 802.11(b) and the CCK modes of IEEE 802.11(g), the channel encoder has the form of a CCK code as defined in IEEE 802.11(b). For higher data rates, the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. In other embodiments, there may be multiple channel encoders, instead of the single channel encoder 104 shown in FIG. 3A.

The channel encoder 104 further converts the serial encoded data stream into M-parallel streams for transmission and provides the M-parallel streams to interleavers 106-108. The interleavers 106-108 receive the encoded data streams and spread the encoded data streams over multiple symbols and multiple transmit paths. This allows improved detection and error correction capabilities at the receiver. In one embodiment, the interleavers 106-108 follow the IEEE 802.11(a) or (g) standard in the backward compatible modes. In another embodiment, the interleavers 106-108 follow the IEEE 802.11(n) standard. In other embodiments, there may be different configurations of the encoder/scrambler/interleaver, such as combinations of single or multiple interleavers, single or multiple encoders, single or multiple scramblers and single or multiple spatial demultiplexers for demultiplexing the serial data stream into M-parallel streams.

Each symbol mapper 110-112 receives a corresponding one of the M-parallel paths of data from interleavers 106-108. Each tone mapper 113-115 maps bit streams to quadrature amplitude modulated QAM symbols (e.g., BPSK, QPSK, 16 QAM, 64 QAM, 256 QAM, et cetera) for each tone of an OFDM channel according to a specific rate table. For IEEE 802.11(a) backward compatibility, double gray coding may be used. The QAM symbols for each tone collectively form a frequency domain OFDM symbol. Each tone mapper 113-115 generate the tones (e.g., subcarriers of an OFDM channel) for a particular transmit antenna, in which each tone contains a sequence of QAM frequency domain symbols. This may also include empty guard tones or pilot tones, i.e., tones known to the receiver.

The complex QAM tone amplitudes produced by each of the tone mappers 113-115 are provided to the IFFT/cyclic prefix addition modules 116-120, which perform frequency domain to time domain conversions and optionally add a prefix, which allows removal of inter-symbol interference at the receiver. For example, a 64-point IFFT can be used for 20 MHz channels and 128-point IFFT can be used for 40 MHz channels. The output of the IFFTs 116-120 are respective time domain OFDM symbols to be transmitted in a respective channel. Each time domain OFDM symbol is a superposition of the time domain QAM symbols for each of the tones. The digital filtering/up-sampling modules 124-128 filter the corresponding symbols and adjust the sampling rates to correspond with the desired sampling rates of the radio portion of the transmitter 100.

FIG. 3B illustrates the radio portion 130 of the transmitter 100 that includes a plurality of digital-to-analog conversion modules 140-144, analog filters 146-156, I/Q modulators 158-162, RF amplifiers 164-168, RF filters 170-174 and antennas 176-180. The M-outputs from the digital filtering/up-sampling modules 124-128 are received by respective digital-to-analog conversion modules 140-144. In operation, the number of radio paths that are active correspond to the number of M-outputs. For example, if only one M-output path is generated, only one of the radio transmitter paths will be active. As one of average skill in the art will appreciate, the number of output paths may range from one to any desired number.

The digital-to-analog conversion modules 140-144 convert the digital filtered and up-sampled signals into corresponding in-phase and quadrature analog signals. The analog filters 146-156 filter the corresponding in-phase and/or quadrature components of the analog signals, and provide the filtered signals to the corresponding I/Q modulators 158-162. The I/Q modulators 158-162 based on a local oscillation, which is produced by a local oscillator 99, up-converts the I/Q signals into radio frequency signals. The RF amplifiers 164-168 amplify the RF signals which are then subsequently filtered via RF filters 170-174 before being transmitted via antennas 176-180.

Generally, a substantially similar process may be implemented in reverse order for a receiver that is operable to receive a communication transmitted by any transmit path of a radio transceiver. It is desirable, though, to build a receiver that may receive and accurately reconstruct a communication signal that is received over the airwaves utilizing a high bandwidth channel to maximize communication rates. For example, new high speed data rate wireless systems are being developed to communicate over 40 MHz channels. It is further desirable, however, to maintain backwards compatibility with older systems that communicate over any one of a plurality of known 10 and 20 MHz channels. A problem exists, however, because a receiver must be able to accurately and quickly determine the transmission characteristics, and more particularly, the bandwidth and center frequency of a received communication signal to properly front end process and demodulate the incoming signal. More specifically, for example, the receiver must determine whether an incoming signal is a 40 MHz channel signal or a 20 MHz bandwidth channel signal? If the signal is a twenty MHz bandwidth channel signal, the receiver must determine whether the signal occupies a lower or upper 20 MHz of the 40 MHz channel.

Figure 4:
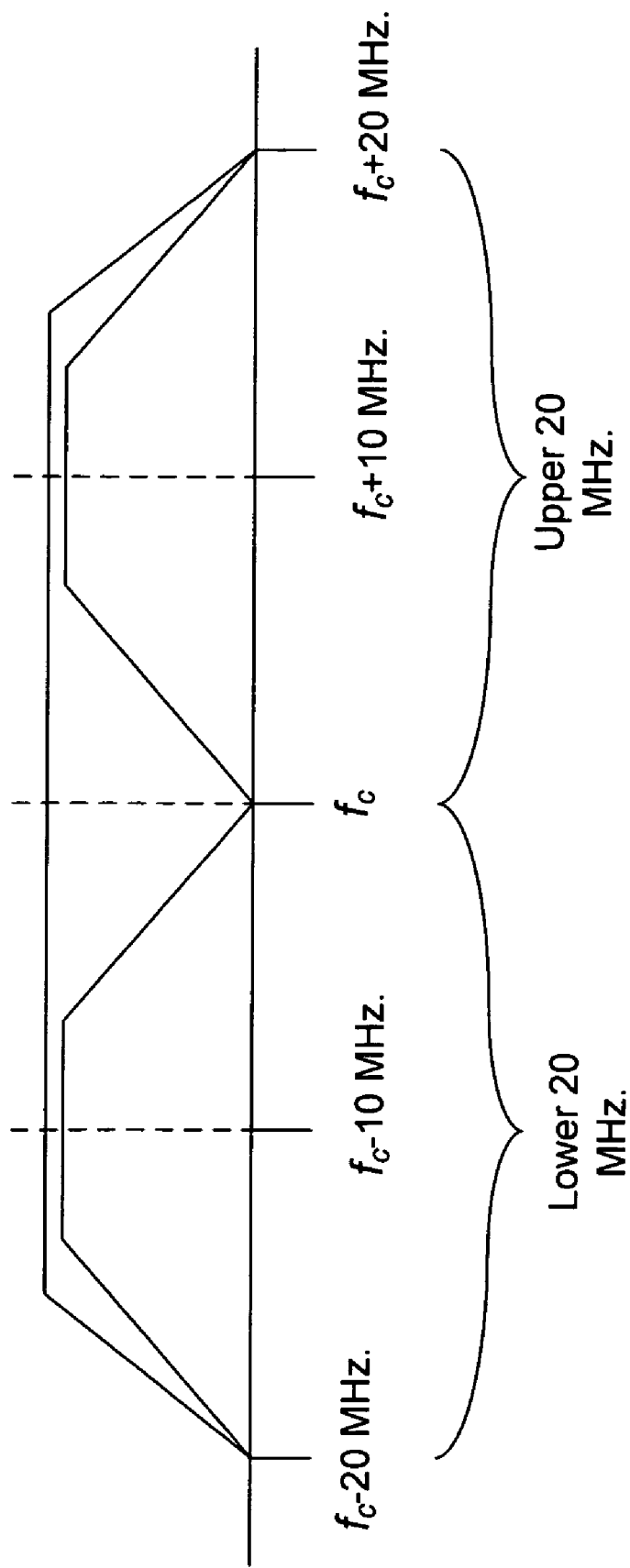
FIG. 4 is a frequency curve that graphically illustrates communication signals that may be received by a receiver formed according to an embodiment of the invention.

FIG. 4 is a frequency curve that graphically illustrates communication signals that may be received by a receiver formed according to an embodiment of the invention. As may be seen, a center channel frequency $f_c$ is shown for a 40 MHz bandwidth signal (e.g, the output of the high pass filter 210 of FIG. 5 below). It may also be seen that two 20 MHz bandwidth channels are present on both sides of the center channel frequency $f_c$. Each of the 20 MHz bandwidth channels will referenced herein as "upper 20 MHz" and "lower 20 MHz" and are characterized by a center channel frequency that is 10 MHz above or below the center channel frequency of the 40 MHz channel (ie., $f_c+10$ MHz, $f_c-10$ MHz), respectively.

The challenge of the receiver, therefore, as a part of determining the transmission format for a received communication signal, is to determine whether a received signal is the lower 20 MHz bandwidth channel signal, the upper 20 MHz bandwidth channel signal, or a 40 MHz bandwidth signal that overlaps the lower and upper 20 MHz bandwidth channels. A further challenge is to accurately make such a determination during a short training sequence of a preamble of a frame prior to a long training sequence of the preamble. Thus, the signal bandwidth classification must be made early in the frame processing. In the described embodiment, the process of classifying the frame is to make a preliminary estimation which is then used for coarse frequency estimation and may be adjusted to make a final estimation after packet gain control determinations are made.

Figure 5:
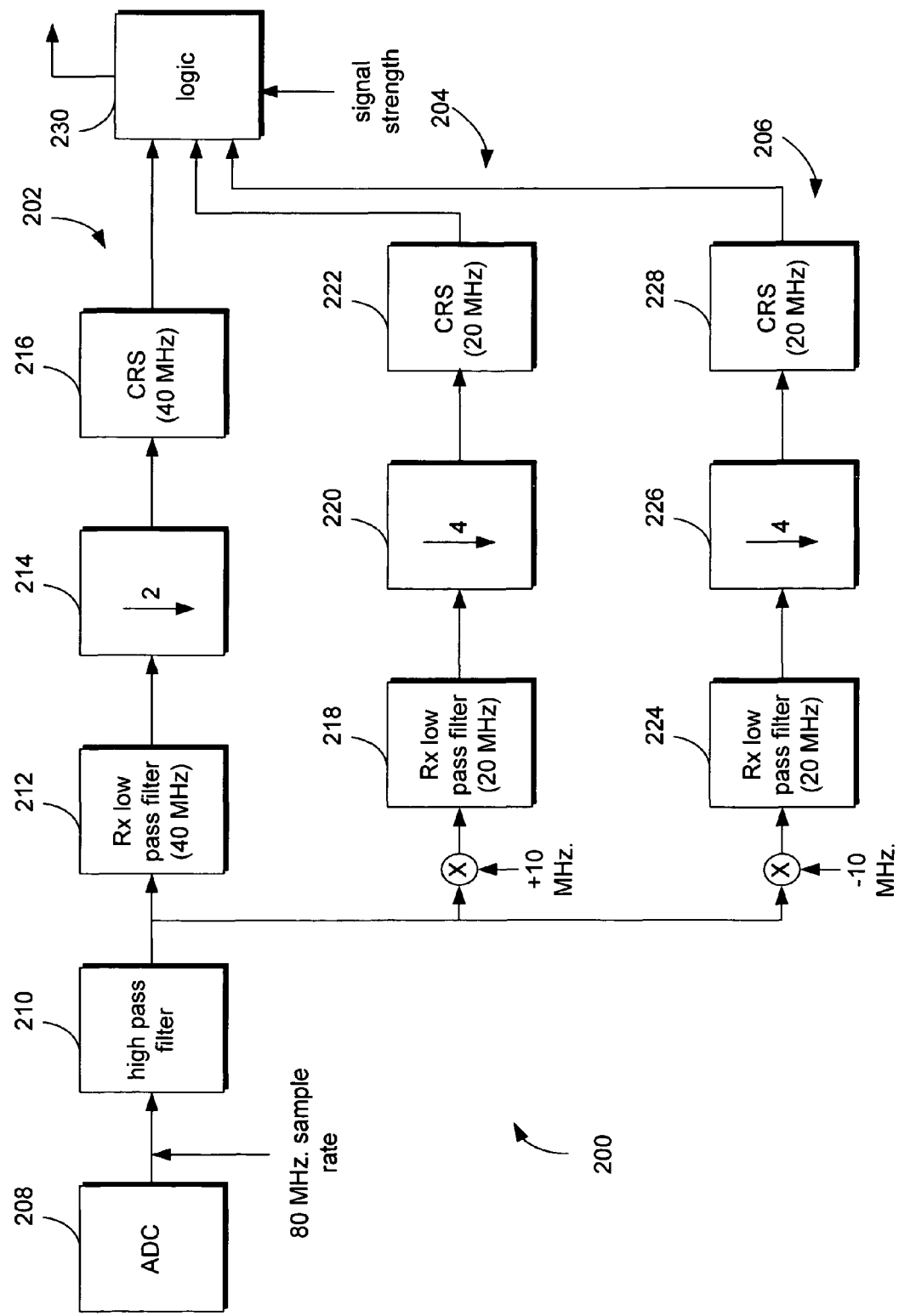
FIG. 5 is a functional block diagram according to one embodiment of the invention.

FIG. 5 is a functional block diagram according to one embodiment of the invention. A receiver 200 includes three or more ingoing receive digital signal paths shown generally at 202, 204 and 206 for processing an ingoing digital signal in parallel to each of the other signal paths. An analog to digital converter 208 receives an ingoing analog signal from a receiver front end and produces an ingoing digital signal stream to a high pass filter 210. High pass filter 210 is operable to block DC and low frequency signal components of the ingoing digital signal stream. The output of filter 210 is then produced to each of the three signal paths shown at 202, 204 and 206. For example, the filtered output of filter 210 is produced to low pass filter 212 which is operable to pass a 40 MHz signal channel. The output of filter 212 is produced to a decimation filter 214 that reduces the sample rate by a factor of 2. The output of decimation filter 214 is then produced to a correlation block 216 that is operable to detect a sequence of tones produced by transmitter as a part of a short training sequence. A logic one output of CRS 216 is an indication of the presence of a 40 MHz bandwidth signal. Though CRS 216 may produce an indication of the presence of a 40 MHz channel bandwidth signal, such indication is not necessarily conclusive as will be described in greater detail below. Low pass filter 212 is a fourth order elliptic filter that provides 30 dB of stopband suppression, 1 dB of passband ripple and −0.5 dB gain at a frequency of 18.5 MHz in one embodiment of the invention.

Similarly, the filtered output of filter 210 is produced to digital mixer that upconverts a received signal to increase the center channel frequency $f_c$ by the amount of 10 MHz. The upconverted signal is then produced to receive low pass filter 218 operable to pass a 20 MHz channel. Low pass filter 218 is similar to low pass filter 212 except that the provided gain is −0.5 dB at 9.0 MHz. The output of filter 218 is then produced to a decimation filter 220 that reduces the sample rate by a factor of 4. The output of decimation filter 220 is then produced to a correlation block (CRS) 222 that is operable to detect a sequence of tones produced by transmitter as a part of a short training sequence. A logic one output of CRS 222 is an indication of the presence of an upper 20 MHz bandwidth signal (ie., the 20 MHz channel above the original center frequency channel of the signal produced by high pass filter 210. Though CRS 222 may produce an indication of the presence of a 20 MHz channel bandwidth signal for the upper 20 MHz, such indication is not necessarily conclusive as will be described in greater detail below.

Finally, the filtered output of filter 210 is produced to mixer that down converts a received signal to decrease the center channel frequency $f_c$ by the amount of 10 MHz. The down converted signal is then produced to receive low pass filter 224 operable to pass a 20 MHz channel. Low pass filter 224 is similar to low pass filter 218 in the described embodiment of the invention. The output of filter 224 is then produced to a decimation filter 226 that reduces the sample rate by a factor of 4. The output of decimation filter 226 is then produced to a correlation block 228 that is operable to detect a sequence of tones produced by transmitter as a part of a short training sequence. A logic one output of CRS 228 is an indication (though not necessarily a conclusive indication) of the presence of a lower 20 MHz bandwidth signal (ie., the 20 MHz channel above the original center frequency channel of the signal produced by high pass filter 210.

Each of the outputs of CRS blocks 216, 222 and 228 are produced to logic block 230 that analyzes the CRS block outputs to determine whether the received communication signal is a lower 20 MHz, an upper 20 MHz or a 40 MHz bandwidth channel signal. As a part of making such a determination, logic 230 is operably disposed to receive a signal strength indication from one or more received signal strength indication blocks (RSSI's) to use such signal strength indications for making at least some indications regarding the bandwidth and location of a received communication signal.

Generally, an object of the circuit of FIG. 5 is to produce indications that are subsequently analyzed by logic to determine whether a received signal is a 40 MHz bandwidth signal or a 20 MHz bandwidth signal. Further, if the signal is a 20 MHz bandwidth signal, associated logic is operable to determine whether the communication signal a lower 20 MHz channel signal (the first 20 MHz of the 40 MHz bandwidth channel) or an upper 20 MHz channel signal (the second 20 MHz of the 40 MHz bandwidth channel).

FIGS. 6 is a table that illustrates operation of one embodiment of the invention. Each of the rows a-h of FIG. 6 represents a Boolean output combination for each of the outputs of the three signal paths 202, 204 and 206 (and more specifically, of CRS blocks 216, 222 and 228) of FIG. 5 and a corresponding logic block 230 determination based upon the Boolean combination of CRS blocks 216-228 and upon at least one signal strength indication. Generally, FIG. 6 illustrates operation and associated logic of the receiver formed according to one embodiment of the invention. The first column labeled "Lower 20 MHz" reflects a logic one output from signal path 206. The second column labeled "Upper 20 MHz" reflects a logic one output from signal path 204. The third column labeled "40 MHz" reflects a logic one output from signal path 202. Finally, the fourth column labeled "Logic Determination" reflects a logic determination of the received communication bandwidth and location based upon a corresponding Boolean combination of the outputs of signal paths 202, 204 and 206 and one or more signal strength indications.

Generally, for any output combination as shown in rows b, c, or e wherein only one of the signal paths 202-206 produced a logic one output, logic 230 for the receiver determines that the signal path 202, 204 or 206 that produced the logic one reflects the signal type that is received. Thus, for example, row c reflects that only signal path 204 produced a logic one. Thus, logic 230 according to one embodiment of the invention is operable to determine that the received signal was an upper 20 MHz signal as shown. If a logic one is received from all three signal paths 202-206, as illustrated in row h of FIG. 6, then logic 230 of the receiver is operable to conclude in one embodiment that a 40 MHz channel bandwidth signal was received. Likewise, if a logic 1 is received from the two rows that detect 20 MHz channels as shown in row g, logic 230 of the receiver is operable to determine that a signal with a 40 MHz channel was received. In one embodiment, such a determination is only made if relative signal strengths (signal power) are within a relative range or approximately equal. Generally, logic 230 may be implemented either in state logic or may be defined by computer instructions executed by a processor.

The difficult decision results from a logic one being produced in only one row for detecting a 20 MHz channel and the row for detecting a 40 MHz channel as illustrated in rows d. and f. of FIG. 6. According to one embodiment of the invention, the power measurements are taken from both 20 MHz channels (the one with a logic one and the one with a logic zero). If the power is relatively similar, the receiver is operable to determine that a 40 MHz channel was detected. Otherwise, a determination is made that a 20 MHz channel signal was received in the channel that corresponds to the row 202-206 of FIG. 4 that produced a logic one output.

The above described embodiments of the invention or alternatives therefor, may also be used as a part of detecting receipt of a legacy communication signal or one of a high data rate or mixed mode signal field. As described before, the determination relating to the channel being used for the incoming communication is based upon a training sequence in which a defined set of tones (e.g., from a short training sequence) transmitted within a preamble of a communication. Making an initial determination as to the type of transmission is beneficial for properly detecting and reading a preamble that is received with the incoming communication signal. For example, in a high data rate transmission mode, a so-called Greenfield mode, a basic formation includes a 24 microsecond pre-amble for transmission of only one stream and an additional 4 microseconds for each additional stream. In a legacy or mixed mode, a pre-ample is allocated 36 microseconds for transmission of only one stream and an additional 4 microseconds for each additional stream. The number of streams equals the number of outputs from STBC encoder. The short training sequence (SS) is 20 MHz for Mixed Mode and 40 MHz for the Greenfield communication. Thus, because the preamble formats vary for received signals, it is important to determine a type of signal from analyzing the channel characteristics.

Figure 7:
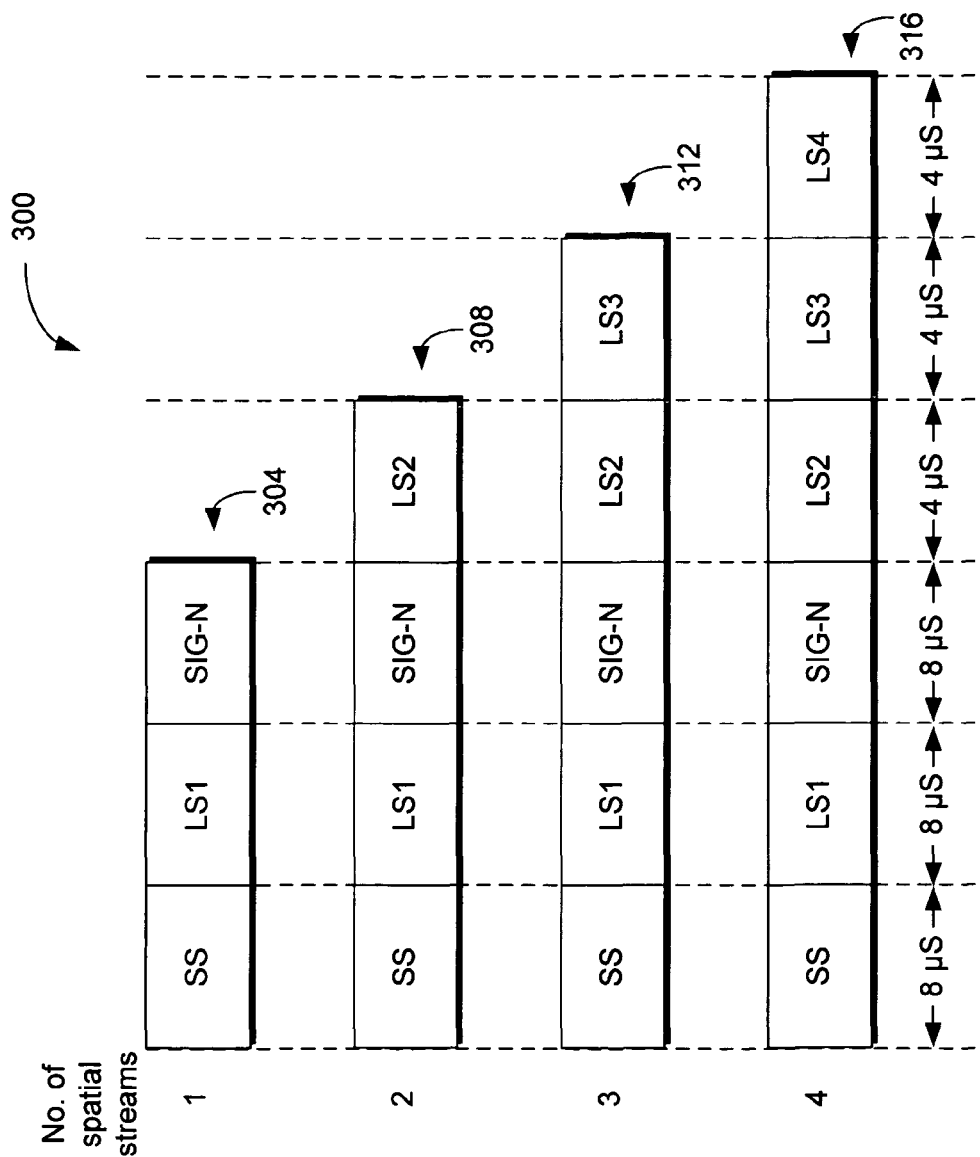
FIG. 7 illustrates a high data rate pre-amble format (e.g., a modified Greenfield format) for 1-4 spatial streams.

To illustrate one embodiment of a preamble detectable by a receiver according to one embodiment of the invention, FIG. 7 illustrates a high data rate pre-amble format (e.g., a modified Greenfield format) for 1-4 spatial streams. As may be seen, the preamble formats shown generally at 300, four preamble formats are shown at rows 304-316 for 1-4 signal streams that are to be transmitted from a corresponding number of antennas. The short training sequence (SS), the first long training sequence (LS1) and the signal field (SIG-N) are each 8 microseconds long while the each subsequent long training sequence (LS2, LS3 and LS4) is 4 microseconds long and adds 4 microseconds to the length (period) of the pre-amble.

To be more specific regarding the preamble lengths, LS1 is 8 microseconds (2 symbols+2 added guard interval periods) wherein the guard interval periods are also known as "cyclic prefixes". LS2-LS4, if present, are each an additional 4 microseconds (1 symbol+1 GI). Referring now to row 304 of FIG. 7, which illustrates transmission from only one spatial stream, a short training sequence SS is followed by a long training sequence LS1 and a signal field SIG-N in the described embodiment of the invention. The short training sequence SS is formed according to 802.11(a) specified formats in the described embodiment of the invention and carries a small set of frequency tones. Specifically, SS comprises ten tones that are each 0.8 microseconds in length. These tones are used by a receiver for one or more purposes including automatic gain control for the incoming signals. Long training sequences, such as LS1, are for enabling the receiver to perform channel estimation for the associated channel or spatial signal stream. A signal field, labeled as SIG-N, follows the first long training sequence. The signal field is for carrying transmission related information including, for example, number of spatial streams, constellation size and bits per symbol in one embodiment. Each of the SS, LS1 and SIG-N fields (including guard intervals) are eight microseconds long in the described embodiment of the invention.

The preceding paragraph defines a pre-amble format for a transmission of one data stream from one antenna. If the transmission is to include additional streams from additional antennas, an additional long training sequence is required for each additional stream to train a receiver properly to enable the receiver to process the incoming streams transmitted from the plurality of antennas. Each additional long training sequence adds 4 microseconds of duration to the length of the preamble. For example, row 316 of FIG. 7 illustrates a field for SS, LS1 and SIG-N as well as a field having a 4 microsecond period for each additional long training sequence shown as LS2, LS3 and LS4 for a transmission that includes four spatial streams.

In the described embodiment of the invention, four long training sequences are generated for transmissions of either 3 or 4 streams. In an alternate embodiment, only three long training sequences (LS1, LS2, LS3) are generated if only three streams are to be transmitted. Finally, it should be noted that every field and, thus, the total length of the preamble is equal to a whole multiple of 4 microseconds. Because of real world variations from design due to process and other variations, an actual period may vary slightly from the specified amounts. Thus, to be more accurate, each field length each total calculated length is approximately equal to a whole multiple of 4 microseconds.

Figure 8:
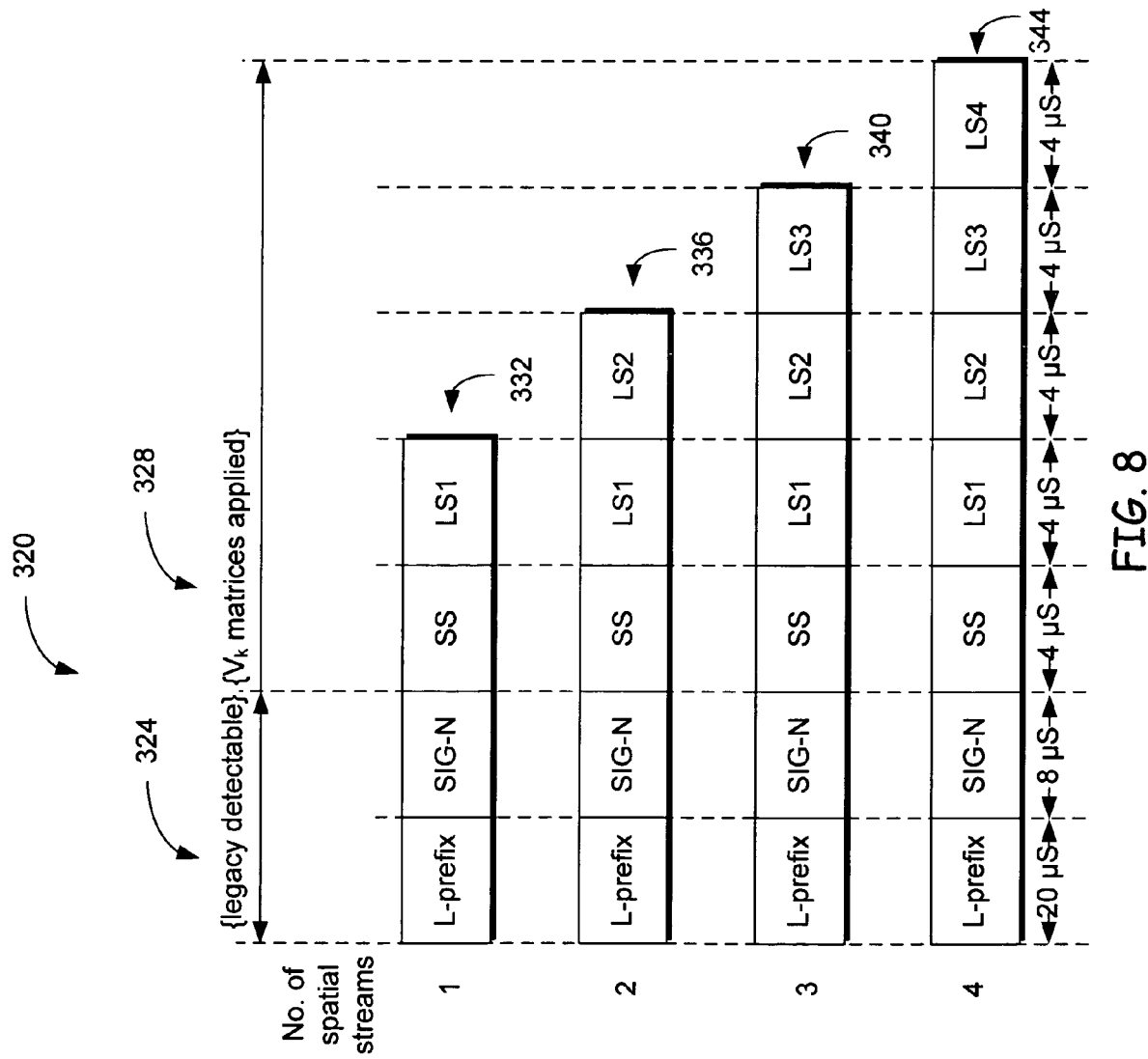
FIG. 8 is an example of a mixed mode pre-amble according to one embodiment of the invention.

FIG. 8 is an example of a mixed mode pre-amble according to one embodiment of the invention. The preamble for mixed mode transmission in this embodiment are shown generally at 320 includes a 20 microsecond legacy prefix. A legacy detectable portion 324 of each mixed mode preamble further includes a SIG-N signal field that follows the legacy prefix (L-prefix). The preamble further includes a short training sequence SS and a long training sequence LS1. Both the legacy prefix and the signal field are shown generally at 324 to represent that the signal is legacy device readable. Remaining fields shown generally at 328 are readable by high data rate (non-legacy) mixed mode receivers. The second short training sequence shown as "SS" in each of the rows 332-344 is added to accommodate automatic gain control (AGC) adjustments and other similar communication set-up type operations including determining channel characteristics as described herein. If beam forming is used, beam forming is applied to signal fields that are transmitted after the SIG-N field in the portion shown generally at 328. In the described embodiment of the invention, SIG-N is modulated using r=1/2 BCC64 encoding with a +90 degree rotated BPSK modulation using two symbol durations (8 microseconds). The same modulation is used for Greenfield (high data rate) and mixed mode transmissions for the SIG-N signal fields. In an alternate embodiment, SIG-N is encoded with BPSK modulation with the 90 degree rotation.

One object of a mixed mode transmission is to support high data rate transmissions is a way that is compatible with legacy devices. As a part of maintaining compatibility, it is advantageous to advise a legacy device to remain silent while the mixed mode transmitter generates communication signals to reduce interference between transmitters. If a high data rate transmitter such as a Greenfield transmitter were to merely transmit, a legacy device may transmit at the same time creating interference between associated communication links. Thus, advantageously, the mixed mode transmitter disclosed herein in FIG. 8 is operable to generate a preamble that enables a different transmitter (a legacy device) to determine to remain silent for the duration of the transmission of the mixed mode frame. Effectively, the legacy field and the short training sequence are operable to advise other legacy and non-legacy transmitters to remain silent. Such protection of the communication channel is known as "phi-layer" protection.

Generally, the radio receiver as described above is operable to classify a received communication signal as being either a 40 MHz bandwidth channel signal or a 20 MHz bandwidth channel signal from one of the upper and lower 20 MHz channels on either side of the center frequency of the 40 MHz channel. More specifically, however, a radio receiver that includes a plurality of receive paths, each further including at least one gain element, a filter element and an ADC sequentially disposed to produce an ingoing digital signal.

A baseband processor operable to receive the ingoing digital signal and to process the ingoing digital signal. The baseband processor further includes, for each received ingoing digital signal, logic to determine and classify the received frame as being a lower first bandwidth, an upper first bandwidth, or a second bandwidth wherein the second bandwidth is sized substantially the same as the sum of upper and lower first bandwidth and approximately occupies the same frequency range. The radio receiver baseband processor further includes analog to digital conversion circuitry and a DC blocking digital filter and further defines at least three digital receive paths that all process the ingoing digital signals as a part of determining how to classify the received frames.

In one receive path, the receiver baseband processor includes three receive processing digital receive paths wherein a first of the at least three digital receive paths comprises a receive low pass filter set to pass a forty megahertz bandwidth signal and a decimation filter operable to receive an output of receive low pass filter and to decimate the receive output of the decimation filter by a first specified decimation value (e.g., 2 in one embodiment). Finally, a CRS detector operable to detect a 40 MHz bandwidth signal produce a logic one if it determines that a 40 MHz channel signal was present.

The second and third of the at least three digital receive paths comprises a receive low pass filter set to pass a twenty megahertz bandwidth signal and a decimation filter operable to receive an output of receive low pass filter of the second receive path and to decimate the receive output of the decimation filter by a second specified decimation value. In one embodiment, the second specified decimation value is equal to four. A CRS detector operable to detect a 20 MHz bandwidth signal. The second and third receive processing paths are operable to detect power in a 20 MHz channel below and above the center frequency of the 40 MHz channel.

The radio receiver includes logic to detect an approximate power in each of the lower first bandwidth, the upper first bandwidth, and the second bandwidth (ie., the lower 20 MHz, the upper 20 MHz, and the 40 MHz channels). The radio receiver is also operable to compare detected power levels in relation to detected signals in the upper and lower first bandwidth regions and the second bandwidth region to determine if a received frame should be classified as a lower first frequency band signal, an upper first frequency band signal, or a second frequency band signal. In the described embodiment, the described processing occurs during a short training sequence. Generally, the classifications correspond to legacy transmissions, mixed mode transmissions and Greenfield transmissions.

The radio receiver is operable to being to determine classification early in the short training sequence (STRN) even though the initially determined classification may be inaccurate. The short training sequence initial determination may be updated to a more accurate determination later wherein an accurate classification is required by early in a subsequent long training sequence (LTRN).

The radio receiver is operable to make coarse channel frequency offset (CFO) estimates with an inaccurate initial classification. A latching signal is stored to indicate that a signal was detected in a specified frequency range wherein the radio receiver is operable to examine for latched values at a time that a final determination about signal classification must be made. The radio receiver is further operable to generate a truth table that indicates detection in each of the signal paths and is further operable to determine signal classifications solely based upon whether a detection pattern as specified in a given row of the truth table matches the detection in each of the signal paths. The radio receiver is operable to determine signal classifications based upon a combination of a detection pattern as specified in a given row of the truth table and whether the detection pattern matches the detection in each of the signal paths and relative signal strengths in associated frequency bands (upper first, lower first, second).

Thus, the radio receiver is operable to determine a classification upon there being a detection in only one of the receive paths, and if a signal is detected in all of the receive paths, the radio receiver is operable to determine that the classification is that of the second frequency band (e.g., the 40 MHz channel frequency band).

The radio receiver is also operable to examine first and second threshold differences of the relative signal strengths (or power levels in another embodiment) to evaluate detection pattern of the receive paths that do not logically dictate a conclusion as to signal type.

Along these lines, FIGS. 9 and 10 are logic flow diagrams that illustrate operation according to two embodiments of the invention. Referring to FIG. 9, a receiver initially determines if a communication signal (received) is a Greenfield signal at 350. If yes, the Greenfield processing is performed at 352. If no, the receiver determines if a mixed mode signal was received at 356. If yes, mixed mode processing is performed at 358. If no, the receiver then evaluates to determine if a legacy transmission was received at 360. If yes, legacy processing occurs at 362. If no, then the frame is indeterminate and processing stops.

Similarly, in FIG. 10, the receiver initially determines if a Greenfield signal was returned at 370 and, if so, performs Greenfield processing at 372. If not, the receiver determines whether the receive communication was legacy or mixed mode at 374. If mixed mode, the receiver performs mixed mode processing at 376. If legacy, the receiver performs legacy processing at 378.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A radio receiver, comprising:
a plurality of receive paths, wherein each of the plurality of receive paths produce an ingoing digital signal in parallel, the each receive path of the plurality of receive paths share at least one gain element, a filter element and an analog-to-digital converter (ADC) sequentially disposed; and
a baseband processor operable to receive each of the ingoing digital signals and to process each of the ingoing digital signals, wherein the baseband processor is operable to, for each of the ingoing digital signals:
determine and classify a received frame of the ingoing digital signals, early in a short training sequence (STRN) of the received frame and prior to a subsequent long training sequence (LTRN) of the received frame, as being a lower first bandwidth, an upper first bandwidth, or a second bandwidth based upon a comparison of a detected power level in relation to a lower first bandwidth region, an upper first bandwidth region, and a second bandwidth region, wherein the second bandwidth is sized substantially the same as sum of the upper and lower first bandwidths and approximately occupies a frequency range of the upper and the lower first bandwidth, wherein the determination and classification of the received frame includes one of a legacy transmission, mixed mode transmissions, and Greenfield transmissions based upon the comparison of the detected power level; and
update the classification of the received frame when inaccurate.

2. The radio receiver of claim 1 wherein the baseband processor further includes a DC blocking digital filter.

3. The radio receiver of claim 2 wherein the baseband processor defines at least three digital receive paths of the plurality of receive paths that correspondingly process each received frame of the ingoing digital signals, wherein each of the at least three digital receive paths is operably disposed to receive an output of the DC blocking digital filter.

4. The radio receiver of claim 3 wherein a first of the at least three digital receive paths comprises a first receive low pass filter set to pass a forty megahertz bandwidth signal.

5. The radio receiver of claim 4 wherein the first of the at least three digital receive paths comprises a first decimation filter operable to receive an output of the first receive low pass filter and to decimate the receive output of the first receive low pass filter by a first specified decimation value to produce a first decimated output.

6. The radio receiver of claim 5 wherein the first specified decimation value is equal to two.

7. The radio receiver of claim 5 further including a first correlation block (CRS) detector operable to detect a 40 MHz bandwidth signal.

8. The radio receiver of claim 3 wherein a second of the at least three digital receive paths comprises a second receive low pass filter set to pass a twenty megahertz bandwidth signal.

9. The radio receiver of claim 8 wherein the second of the at least three digital receive paths comprises a second decimation filter operable to receive an output of the second receive low pass filter and to decimate the second receive low pass filter output by a second specified decimation value.

10. The radio receiver of claim 9 wherein the second specified decimation value is equal to four.

11. The radio receiver of claim 10 further including a second CRS detector operable to detect a 20 MHz bandwidth signal.

12. The radio receiver of claim 3 wherein a third of the at least three digital receive paths includes a third receive low pass filter set to pass a twenty megahertz bandwidth signal.

13. The radio receiver of claim 12 wherein the third of the at least three digital receive paths includes a third decimation filter operable to receive an output of the third receive low pass filter of the third receive path and to decimate the receive output of the decimation filter by the second specified decimation value.

14. The radio receiver of claim 13 wherein the second specified decimation value is equal to four.

15. The radio receiver of claim 14 further including a third CRS detector operable to detect a 20 MHz bandwidth signal.

16. The radio receiver of claim 15 wherein the baseband processor is further operable to:
detect an approximate power in each of the lower first bandwidth, the upper first bandwidth, and the second bandwidth.

17. The radio receiver of claim 1 wherein coarse channel frequency offset (CFO) estimates are updated with an updated initially determined classification of the received frame in the event that the initial classification is inaccurate.

18. A radio receiver, comprising:
a plurality of receive paths, wherein each of the plurality of receive paths produce an ingoing digital signal in parallel, the each receive path of the plurality of receive paths share at least one gain element, a filter element and an analog-to-digital converter (ADC) sequentially disposed;
a baseband processor operable to receive each of the ingoing digital signals along a corresponding plurality of signal paths and to process each of the ingoing digital signals wherein the baseband processor is further operable to:
generate a truth table that indicates detection in each signal path of the plurality of signal paths;
determine and classify a received frame of the ingoing digital signals as being a lower first bandwidth, an upper first bandwidth, or a second bandwidth based upon whether a detection pattern in a given row of the truth table matches a detection pattern in the each signal path of the plurality of signal paths and relative signal strengths in associated frequency bands of upper first, lower first, and second frequency bandwidth regions, relating to a lower first bandwidth region, an upper first bandwidth region, and a second bandwidth region, wherein the second bandwidth is sized substantially the same as the sum of the upper and lower first bandwidths and approximately occupies a frequency range of the upper and the lower first bandwidth based upon outputs of the plurality of signal paths, wherein there are first and second threshold differences of the relative signal strengths or power levels that are used according to the detection pattern of the receive paths; and
store a latching signal to indicate that a signal was detected in a specified frequency range based upon outputs of each of the plurality of signal paths, wherein the radio receiver is operable to examine for latched values when a final determination about signal classification must be made.

19. The radio receiver of claim 18 wherein the baseband processor is further operable to:
determine and classify the received frame solely based upon whether the detection pattern as specified in the given row of the truth table matches the detection in each of the signal paths.

20. The radio receiver of claim 18 wherein the baseband processor is further operable to:
determine and classify the received frame upon there being a detection in only one of the receive paths of the plurality of receive paths.

21. The radio receiver of claim 18 wherein the baseband processor is further operable to:
determine and classify the received frame upon there being a detection in all of the receive paths wherein the baseband processor is operable to determine that the classification is that of the second bandwidth.

* * * * *